United States Patent [19]

Okuda

[11] Patent Number: 5,450,601
[45] Date of Patent: Sep. 12, 1995

[54] NODE EVALUATION DATA COLLECTION AND DISTRIBUTION SYSTEM FOR LOCAL OR WIDE AREA NETWORKS

[75] Inventor: Haruki Okuda, Tokyo, Japan
[73] Assignee: Hitachi, Ltd., Tokyo, Japan
[21] Appl. No.: 985,943
[22] Filed: Dec. 4, 1992

[30] Foreign Application Priority Data

Dec. 6, 1991 [JP] Japan .................................. 3-322212

[51] Int. Cl.[6] ............................................. H04L 12/28
[52] U.S. Cl. ..................................... 395/800; 395/375
[58] Field of Search ................... 395/200, 500; 370/60, 370/85.1, 85.13; 371/16.1; 464/550; 380/21

[56] References Cited

U.S. PATENT DOCUMENTS

| | | | |
|---|---|---|---|
| 4,858,152 | 8/1989 | Estes | 464/550 |
| 4,881,263 | 11/1989 | Herbison et al. | 380/21 |
| 4,887,260 | 12/1989 | Carden et al. | 370/60 |
| 4,922,491 | 5/1990 | Coale | 371/16.1 |
| 5,067,107 | 11/1991 | Wade | 395/500 |
| 5,079,765 | 1/1992 | Nakamura | 370/85.13 |
| 5,109,486 | 3/1992 | Seymour | 395/200 |
| 5,136,580 | 8/1992 | Videlock et al. | 370/60 |
| 5,153,876 | 10/1992 | Sin | 370/85.1 |

Primary Examiner—Kevin J. Teska
Assistant Examiner—Dan Fiul
Attorney, Agent, or Firm—Antonelli, Terry, Stout & Kraus

[57] ABSTRACT

An evaluation data collecting system for an information processing system which connects plural processing nodes to each other by communication paths. The evaluation collecting system includes an I/O unit provided at each of the processing nodes so as to input an collection request of the evaluation data for a processing node at issue and other processing nodes and to output the evaluation data from the other processing nodes; a processing unit provided at each of the processing nodes so as to process an input of the collection request for the evaluation data and an output of the evaluation data at said I/O unit; and a storage unit provided at each of the processing nodes so as to provide the evaluation data for each processing node at issue and that for the other processing nodes with a time element to synchronize data transfer between the processing nodes and to store the evaluation data for each processing node at issue and the other processing nodes in substantially the same data format. Thus, the evaluation data collecting system can collect the evaluation data representative of the operation state of each of the processing nodes from any of the processing nodes.

6 Claims, 6 Drawing Sheets

121 RESPONSE INFORMATION RECORD

| STORING TIME | STORAGE AREA | TRANS-ACTION NAME | SERIAL NUMBER | TRANSACTION INPUT TIME | TRANSACTION OUTPUT TIME | TRANSACTION INPUT TIME | TRANSACTION OUTPUT TIME |
|---|---|---|---|---|---|---|---|

INFORMATION DISCRIMINATION CODE 121a, 121b

FIG. 3B

122 RESOURCE LOAD INFORMATION RECORD

| STORING TIME | STORAGE AREA | RESOURCE LOAD DATA (CPU USING RATE, CHANNEL USING RATE, etc.) |
|---|---|---|

INFORMATION DISTRIBUTION CODE

FIG. 3C

123 BATCH PROCESSING STATE INFORMATION RECORD

| STORING TIME | STORAGE AREA | BATCH NAME | SERIAL NUMBER | STARTING TIME | ENDING TIME |
|---|---|---|---|---|---|

INFORMATION DISTRIBUTION CODE

| PROCESSING NODE | EVALUATION DATA | TIME | | | | | | | | |
|---|---|---|---|---|---|---|---|---|---|---|
| | | UNIT TIME | UNIT TIME | UNIT TIME | UNIT TIME | UNIT TIME | UNIT TIME | UNIT TIME | UNIT TIME | UNIT TIME |
| HOST NODE (124) | CPU USING RATE | ○ | ○ | ○ | ○ | ○ | ○ | ○ | ○ | ○ |
| | CHANNEL USING RATE | ○ | ○ | ○ | ○ | ○ | ○ | ○ | ○ | ○ |
| | BATCH PROCESSING STATE | HOST BATCH 1 START/END TIME | | | | | HOST BATCH 2 START/END TIME | | | |
| | RESPONSE (WITHIN HOST) | TRANSACTION 1 INPUT/OUTPUT TIME | | | | | TRANSACTION 2 INPUT/OUTPUT TIME | | | |
| | NUMBER OF TRANSACTIONS | ○ | ○ | ○ | ○ | ○ | ○ | ○ | ○ | ○ |
| DISTRIBUTED NODE (125) | CPU USING RATE | ○ | ○ | ○ | ○ | ○ | ○ | ○ | ○ | ○ |
| | CHANNEL USING RATE | ○ | ○ | ○ | ○ | ○ | ○ | ○ | ○ | ○ |
| | BATCH PROCESSING STATE | DISTRIBUTED HOST BATCH 1 START/END TIME | | | | | DISTRIBUTED HOST BATCH 2 START/END TIME | | | |
| | RESPONSE (WITHIN DISTRIBUTED HOST) | TRANSACTION 1 INPUT/OUTPUT TIME | | | | | TRANSACTION 2 INPUT/OUTPUT TIME | | | |
| | NUMBER OF TRANSACTIONS | ○ | ○ | ○ | ○ | ○ | ○ | ○ | ○ | ○ |
| TERMINAL NODE (126) | CPU USING RATE | ○ | ○ | ○ | ○ | ○ | ○ | ○ | ○ | ○ |
| | BATCH PROCESSING STATE | TERMINAL BATCH 1 START/END TIME | | | | | TERMINAL BATCH 2 START/END TIME | | | |
| | RESPONSE | TRANSACTION 1 INPUT/OUTPUT TIME | | | | | TRANSACTION 2 INPUT/OUTPUT TIME | | | |

NODE EVALUATION DATA COLLECTION AND DISTRIBUTION SYSTEM FOR LOCAL OR WIDE AREA NETWORKS

BACKGROUND OF THE INVENTION

The present invention relates to an evaluation data collecting system for collecting the operation status of processing nodes such as a host computer, a distributed computer and a terminal device which are connected with one another, and more particularly to the evaluation data collecting system for an information processing system for storage, correcting and outputting of evaluation data which is preferable to system evaluation of the response time in these on-line systems.

For example, in the system evaluation method for the response time in conventional on-line systems, the evaluation data for each processing node is stored in the format peculiar to the processing node, the data is collected for each processing node to be edited, processed and output individually, and thereafter the data is correlated by manual operation to obtain materials for system evaluation. The response time is evaluated using the materials thus obtained. Such technology is disclosed in JP-A-2-310741.

As described above, in the prior art, several kinds of evaluation data for each of processing nodes, such as a host computer, a distributed computer and a terminal device, are stored in the format peculiar to each of these processing nodes. It takes a relatively long time to correlate the several kinds of evaluation data for each processing node. Further, formats for the several kinds of evaluation data are different for different processing nodes (e.g. the number of items) so that the processing node cannot be specified to collect the correlated evaluation data collectively.

Furthermore, the evaluation data refers to resource load information (CPU using rate, channel using rate, etc.), batch processing state information, etc. which are related to the response information. Processing nodes includes the host computer, distributed computer, terminal device, etc.

SUMMARY OF THE INVENTION

An object of the present invention is to provide an evaluation data collecting system for an information processing system for collection, storage and outputting evaluation data which can easily correlate several kinds of evaluation data for each processing node so that it can collect the evaluation data for all processing nodes and can edit and process the collected evaluation data in the processing node that required the evaluation data to be collected.

In order to attain the above object of the present invention, there is provided an evaluation data collecting system for an information processing system which connects plural processing nodes with one another by communication paths and collects the evaluation data representative of the operation state of each of the processing nodes from any of the processing nodes, including an I/O unit provided at each processing node so as to input a collection request of the evaluation data for a subject processing node and other processing nodes and to output the evaluation data from the other processing nodes; a processing unit provided at each of the processing nodes so as to process an input of the collection request for the evaluation data and an output of the evaluation data at the I/O unit; and a storage unit provided, at each of the processing nodes so as to provide the evaluation data for each processing node at issue as well as the other processing nodes, with a time element to synchronize data transfer between said processing nodes and so as to store the evaluation data for each processing node at issue as well as the other processing nodes in substantially the same data format.

The plural processing nodes include a terminal node, a distributed host node connected with the terminal node through a LAN (Local Area Network) and a host node connected with the distributed host node through a WAN (Wide Area Network).

Each of said processing node, distributed host node and host node includes the I/O unit, the processing unit and the storage unit.

The evaluation data includes response information, resource load information and batch processing state information. The response information includes records of an input time when a transaction request for collecting evaluation data for the other nodes is input for any one of the terminal node, distributed host node and host node and an output time when the transaction is output from the one node to the other nodes. The resource load information includes records of the using rate of a CPU (Central Processing Unit) in the processing unit and the channel using rate for data input/output for a data storage device in the storage unit. The batch processing state information includes records of starting and ending times of batch processing when the CPU in the processing unit are used for the batch processing.

Each of the response information, resource load information and batch processing information includes an information discrimination code, for discriminating each of these items of information from other items, and a storing time. The storing time of the response information is data indicating when the transaction has been stored in the storage unit, what data the resource information represents when the CPU using rate and channel using rate have been stored in the storage unit, and what data the batch processing state information represents when a batch processing program has been stored in the storage unit.

The data format of each of the response information, resource load information and batch processing state information includes an information discrimination code, a storing time and storage area as time elements in succession from its start.

The same information discrimination code and storage area among the response information, resource load information and batch processing state information correlate at least these items of information so that evaluation data is specified for any one of said terminal node, distributed host node and host node.

Each item of information of the response information, resource load information and batch processing state information with their information discrimination codes and storage areas corresponding with one another and their storing times corresponding with one another is supplied to each of the host node, distributed host node and terminal node.

As described above, the plural processing nodes are caused to have the evaluation data in the same data format and correlated in terms of the information discrimination code and storage area, and the evaluation data is given the storing time indicating when the data has been created. So, the evaluation data for all of the processing nodes at any time can be collected and output in any processing node. Therefore, the performance between the processing nodes in a hierarchical form can be efficiently evaluated without using manual operation and that of the specific processing node can also be easily evaluated.

DESCRIPTION OF THE PREFERRED EMBODIMENTS

Now referring to the drawings, an explanation will be given of an embodiment of the present invention.

Figure 1:
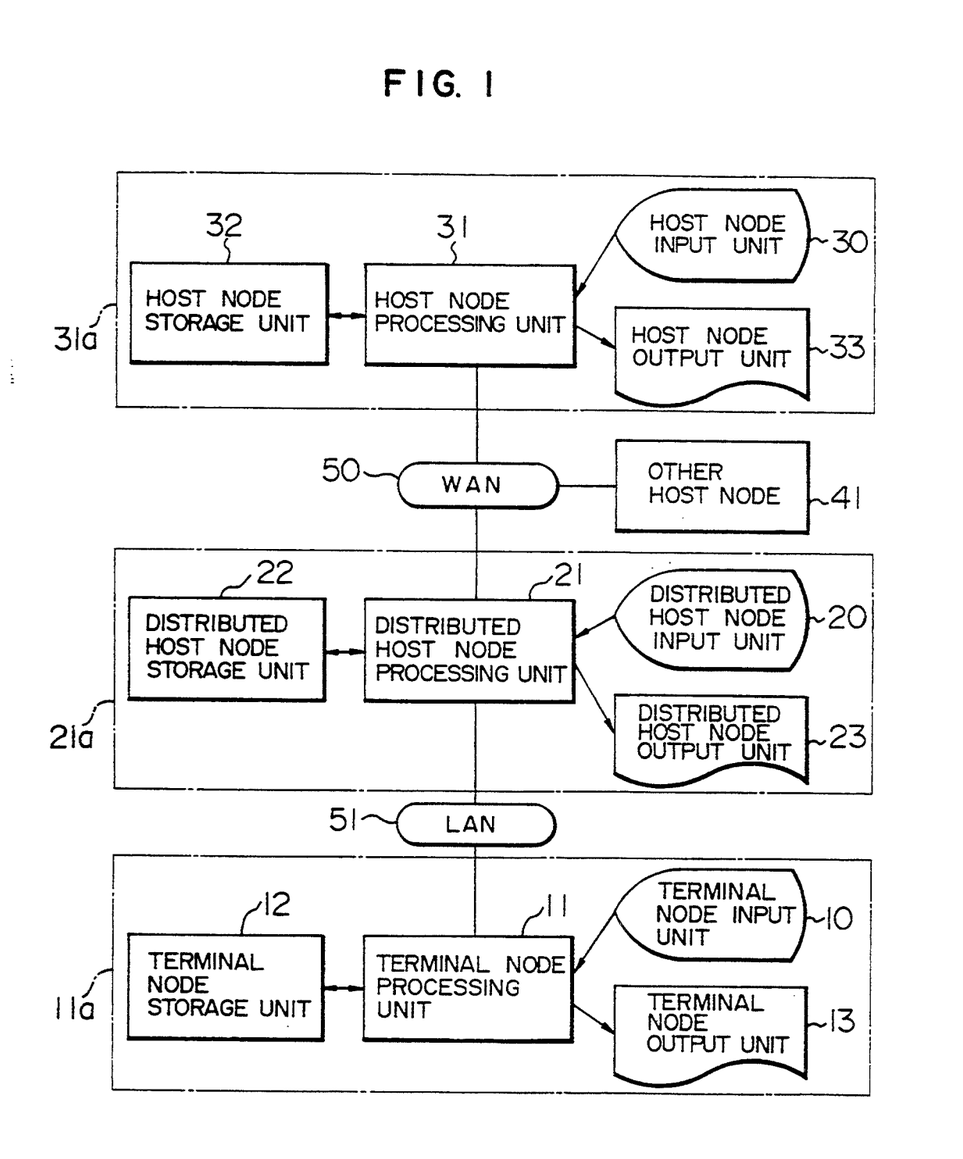
FIG. 1 is a block diagram showing an arrangement of the on-line system constituting a system for storing, collecting and outputting evaluation data according to the present invention.

FIG. 1 shows the arrangement of the on-line system according to one embodiment of the present invention. As seen from FIG. 1, in this embodiment, the on-line system is made up of three processing nodes. A host node processing unit 31 of a host node 31a includes a host node storage unit 32 for storing the evaluation data within the host node 31a, a host node input unit 30 for requesting the collection of evaluation data for processing nodes inclusive of the host node 31a itself and the editing, processing and outputting thereof, and a host node output unit 33 for performing the editing, processing and outputting of the evaluation data for the processing nodes inclusive of the host node 31a itself. A distributed host node processing unit 21 of a host node 21a includes a distributed host node storage unit 22 for storing the evaluation data within the distributed host node 21a, a distributed host node input unit 20 for requesting the collection of evaluation data for processing nodes inclusive of the distributed host node 21a itself and the editing, processing and outputting thereof, and a host node output unit 23 for performing the editing, processing and outputting of the evaluation data for the processing nodes inclusive of the distributed host node 21a itself. A terminal node processing unit 11 of a terminal node 11a includes a terminal node storage unit 12 for storing the evaluation data within the terminal node 11a, a terminal node input unit 10 for requesting the collection of evaluation data for processing nodes inclusive of the terminal node 11a itself and the editing, processing and outputting thereof, and a terminal node output unit 13 for performing the editing, processing and outputting of the evaluation data for the processing nodes inclusive of the terminal node 11a itself.

The host node processing unit 31 is connected to the distributed host node processing unit 21 through a WAN (Wide Area Network) 50, and another host node 41 is also connected with the WAN 50. The distributed host node processing unit 21 is connected to the terminal node processing unit 11 through a LAN (Local Area Network) 51.

Figure 2:
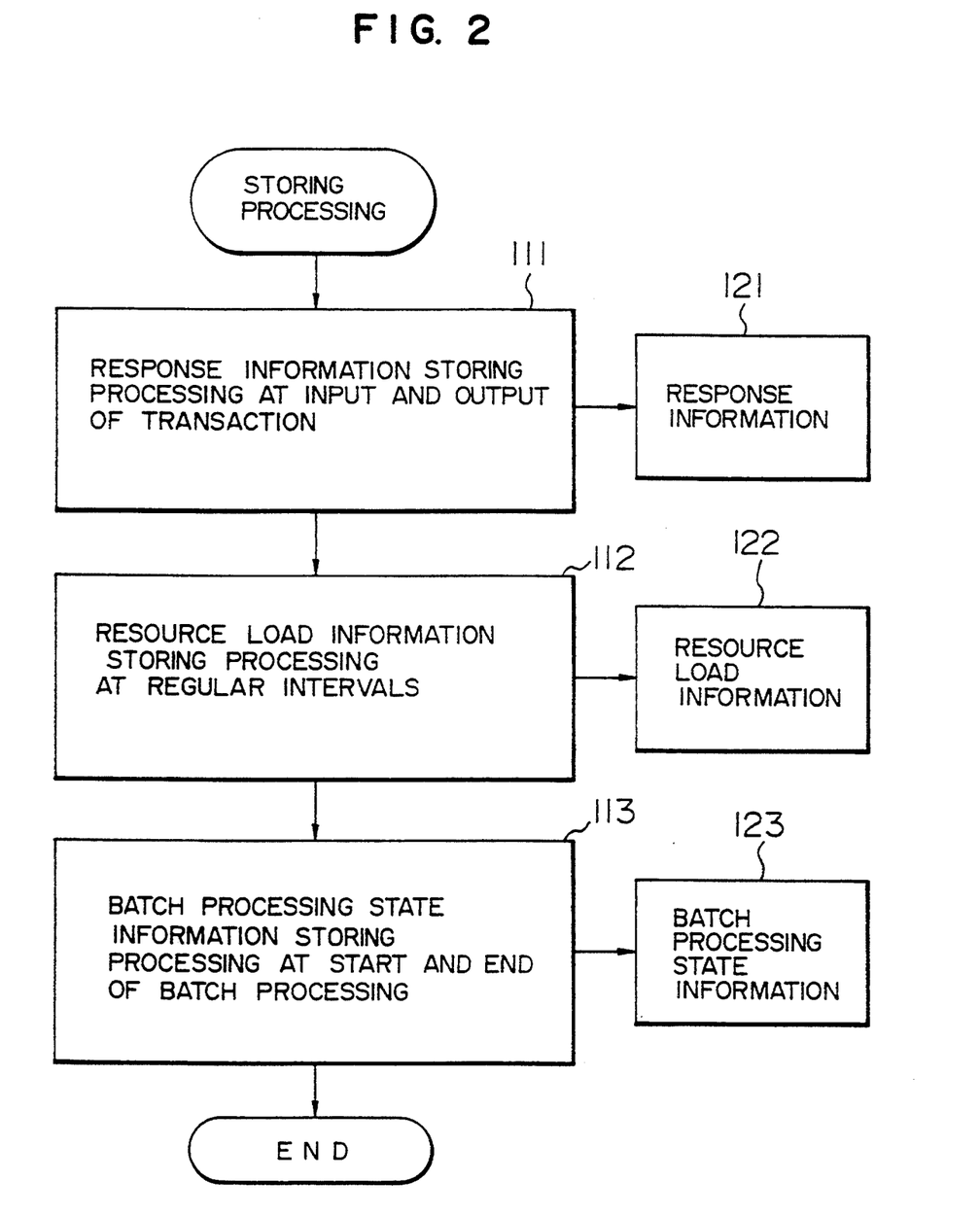
FIG. 2 is a flowchart for explaining the processing of storing evaluation data in each processing node.
Figure 3A:
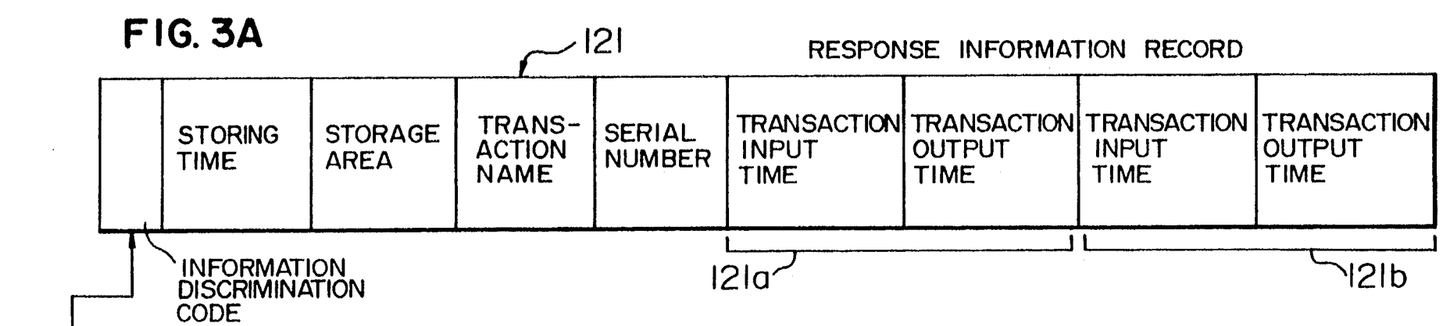
FIGS. 3A, 3B and 3C are views showing examples of formats of evaluation data.

FIG. 2 shows the flow of the processing of storing evaluation data in the terminal node 11a which is one of the processing nodes. In FIG. 2, for example, when the terminal node 11a makes an inquiry of the distributed host node 21a and the host node 31a, it performs response information storing processing 111 which stores, in the terminal node storage unit 12, response information 121 which includes an input time when the terminal node processing unit 11 has received an inquiry transaction from the terminal node input unit 10, an output time when this transaction has issued from the terminal node processing unit 11 to the distributed host node 21a and the host node 31a through the LAN 51, another input time when the terminal node processing unit 11 has received a transaction from the distributed host node 21a and the host node 31a through the LAN 51 and another output time when the transaction has been sent to the terminal node output unit 13. A typical format of the response information 121 is shown in FIG. 3A.

Figure 3B:
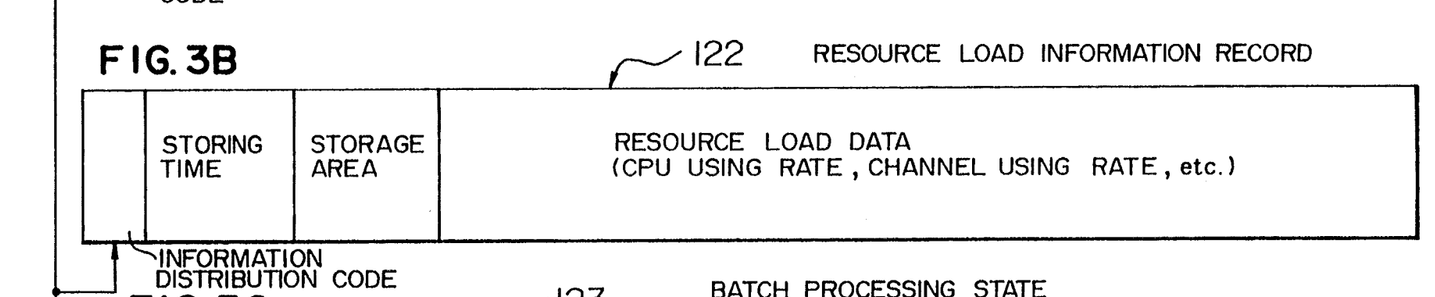

Likewise, in the terminal node 11a, resource load information storing processing 112 stores the using rate of a CPU in the terminal node 11a within a fixed interval in the terminal node storage unit 12. A typical format of the resource load information 122 is shown in FIG. 3B.

Figure 3C:
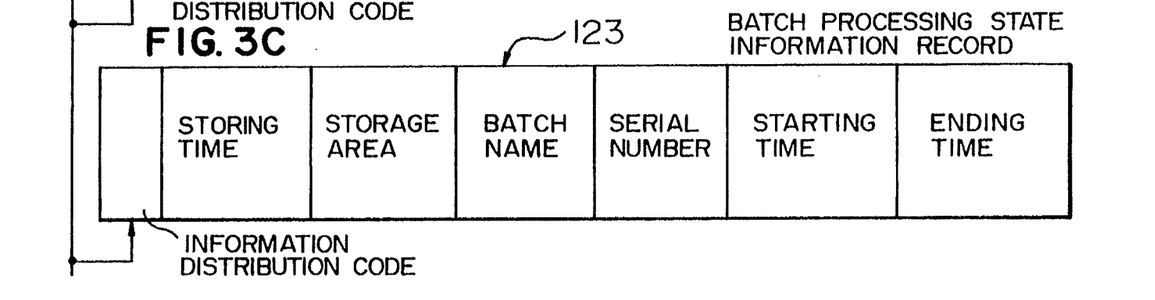

Likewise, in the terminal node 11a, batch processing state information storing processing 113 stores, in the terminal node storage unit 12, e.g. the starting and ending times of the batch processing in the terminal node 11a. A typical format of the batch processing state information 123 is shown in FIG. 3C.

In connection with FIG. 2, an explanation has been given of the storing of the response information 121, resource load information 122 and batch processing state information 123 which are used as evaluation data in the terminal node 11a. But, in the same manner, the distributed host node 21a and the host node 31a also store the evaluation data. As described above, the response information 121, resource load information 122 and batch processing state information 123 are stored in the terminal node storage unit 121. But, more specifically, all of the respective storage units 32, 22 and 12 of the host node 31a, distributed host node 21a and terminal node 11a, explained in connection with FIG. 1, include storage areas for the response information 121, resource load information 122 and batch processing state information 123, as shown in FIGS. 3A, 3B and 3C, respectively. In short, all of the respective storage areas of the host node storage unit 32, distributed host node storage unit 22 and terminal node storage unit 12 have the same format for the evaluation data.

A further explanation will be given of FIGS. 3A, 3B and 3C. Where the response information 121 is to be used for the terminal node 11a, i.e., it is stored in the storage area of the terminal node storage unit 12, an area 121a is used to record the input time when a transaction is input from the terminal node input unit 10 to the terminal node 11a and the output time when the transaction is output from the terminal node processing unit 11 of the terminal node 11a via the LAN 51 to the distributed host node 21a or host node 31a, and an area 121b is used to record the input time when a transaction from the distributed host node 21a or host node 31a is input to the terminal node 11a via the LAN 51 and the output time when the transaction is output to the terminal node output unit 13 through the terminal node processing unit 11.

Where the response information 121 is to be used for the distributed host node 21a, the area 121a is used to record the input time when the distributed host node processing unit 21 has received a transaction from the terminal node 11a through the LAN 51 and the output time when the transaction is output from the distributed host node 21a via the WAN 50 to the host node processing unit 31 of the host node 31a, and the area 121b is used to record the input time when the distributed host node processing unit 21 has received a transaction from the host node processing unit 31 through the WAN 50 and the output time when the transaction is output from the distributed host node processing unit 21 to the terminal node 11a through the LAN 51.

Where the response information 121 is to be used for the host node 31a, the area 121a is used to record the input time when the host node processing unit 31 has received a transaction from the distributed host node 21a or the terminal node 11a and the output time when the transaction is output from the host node processing unit 31 via the WAN 50 to the distributed host node processing unit 21 of the distributed host node 21a.

As in the terminal node 11a described above, both the host node 31a and the distributed host node 21a can perform the transaction input/output operation by means of the input and output units 30 and 33 of the former and the input and output units 20 and 23 of the latter. A serial number is given for each transaction inquiry. A transaction name refers to the data representing the name of work which e.g. the terminal node 11a inquires from the distributed host node 21a. A storage area refers to the data indicating in which of the terminal node storage unit 12, distributed host node storage unit 22 and host node storage unit 32 the transaction at issue has been stored. A storage time refers to the data indicating when the transaction designated by the transaction name has been in the area designated by the storage area. An information discrimination code refers to the data for discriminating the response information 121, resource load information 122 and batch processing state information 123 from one another.

Where the resource load information 122 shown in FIG. 3B has been stored in the storage unit 12 of the terminal node 11a, resource load data refers to the data representing the using rate of CPU included in the terminal node 11a itself and that of a channel for data input/output such as a disk unit in the terminal node 11a. A storage area refers to the data indicating in which of the terminal node storage unit 12, distributed host node storage unit 22 and host node storage unit 32 the transaction at issue has been stored. A storage time refers to the data indicating when the resource load data has been in the area designated by the storage area. An information discrimination code refers to the data for discriminating the response information 121, resource load information 122 and batch processing state information 123 from one another.

Where the batch processing state information 123 shown in FIG. 3C has also been stored in the storage unit 12 of the terminal node 11a, starting and ending times refer to the data representing the times for starting and ending the batch processing which the terminal node 11a itself has performed. A serial number refers to the data indicating the serial number given for each creation of batch processing. A batch name refers to the data indicating the serial number given for each batch processing. A storage area refers to the data indicating in which of the terminal node storage unit 12, distributed host node storage unit 22 and host node storage unit 32 the transaction at issue has been stored. A storing time refers to the data indicating when the batch program designated by the batch name has been in the area designated by the storage area. An information discrimination code refers to the data for discriminating the response information 121, resource load information 122 and batch processing state information 123 from one another.

As described above, the response information 121, resource load information 122 and batch processing state information 123 shown in FIGS. 3A, 3B and 3C have been in the storage areas of the respective storage units 32, 22 and 12 of the host node 31a, distributed host node 21a and terminal node 11a.

If the above described information discrimination code indicates that the storage areas of the response information 121, resource load information 122 and batch processing state information 123 agree with one another, these items of information 121, 122 and 123 are correlated with each other.

Figure 4:
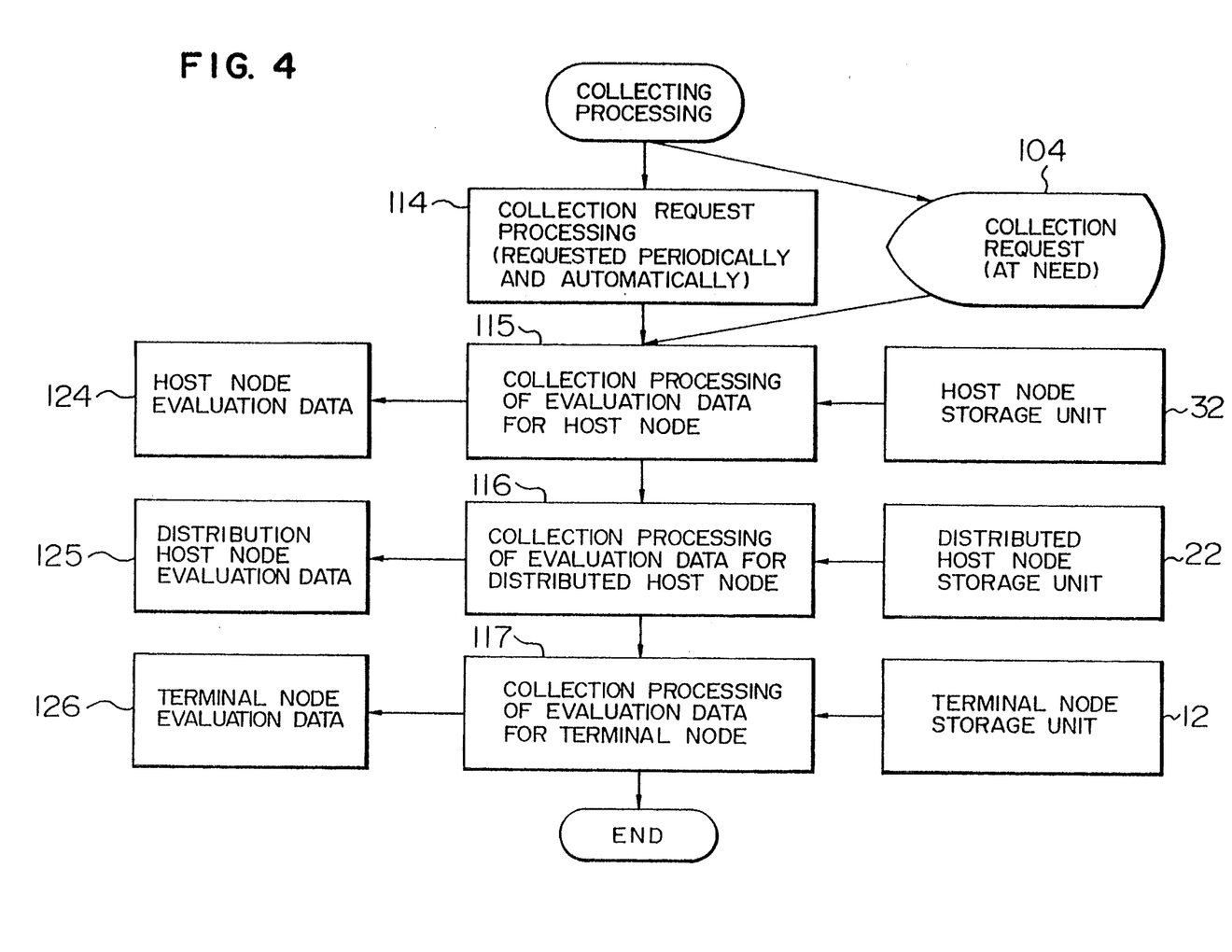
FIG. 4 is a flowchart showing the processing of collecting evaluation data in a terminal node.

FIG. 4 is a flowchart of the processing for collecting evaluation data in the terminal node 11a serving as a processing node. It is assumed that the program represented by this flowchart is also included in the host node 31a and distributed host node 21a as well as the terminal node 11a. Along with the flowchart shown in FIG. 4, an explanation will be given of the processing of collecting evaluation data in the terminal node 11a.

Collection request processing 114 periodically and automatically requests that the evaluation data for other processing nodes (i.e., the host node 31a and distributed host node 21a) and the terminal node 11a itself be input. Collection request 104 manually requests that the evaluation data be input as necessity requires. In response to the request from the collection request processing 114 or collection request 104, stored information collecting processing 115 for the host node inputs the evaluation data from the storage unit 32 of the host node 31a and stores it in the storage area of the terminal node storage unit 12 as the evaluation data 124 for the host node 31a. The stored evaluation data 124 includes the response information 121, resource load information 122 and batch processing state information 123 stored in the same area, i.e. correlated with one another.

Stored information collecting processing 116 for the distributed host node inputs the evaluation data from the storage unit 22 of the distributed host node 21a and stores it in the storage area of the terminal node storage unit 12 as the evaluation data 125 for the host node 21a. The stored evaluation data 125 also includes the response information 121, resource load information 122 and batch processing state information 123 stored in the same area.

Stored information (i.e. evaluation data for the terminal node 11a itself) collecting processing 117 for the terminal node extracts the evaluation data from the storage unit 12 of the terminal node 11a and stores it in the storage area of the terminal node storage unit 12 as the evaluation data 126 for the terminal node 11a. The stored evaluation data 126 also includes the response information 121, resource load information 122 and batch processing state information 123 stored in the same area.

Not only the terminal node 11a but the host node 31a and distributed host node 21a can input the evaluation data for the processing nodes other than themselves, along the flowchart of FIG. 4. For example, the distributed host node 21a stores, in the storage area of its storage unit 22, the respective evaluation data 126, 124 and 125 for the terminal node 11a, host node 31a and itself. The host node 31a also stores the evaluation data 124, 125 and 126.

Figure 5:
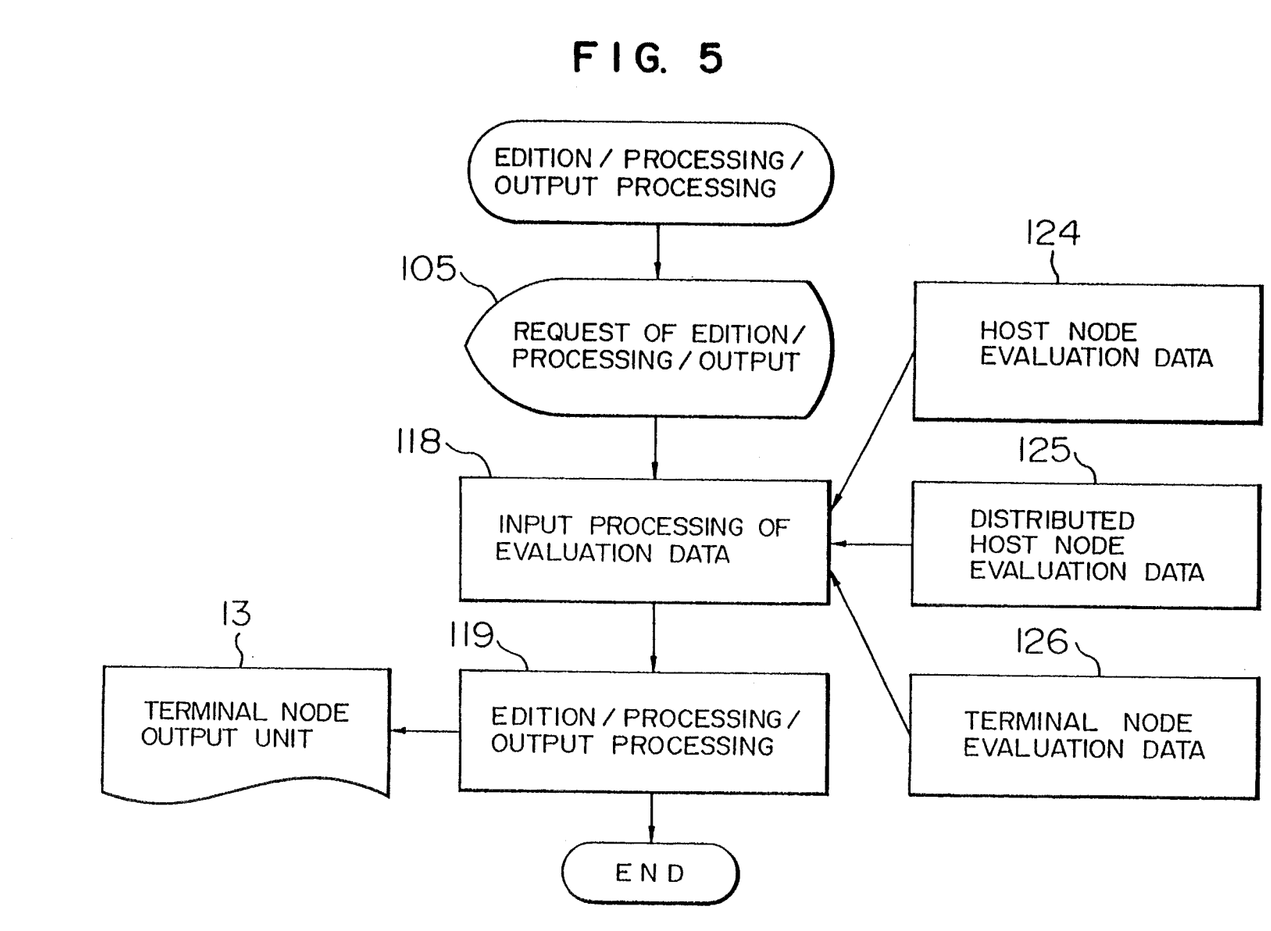
FIG. 5 is a flowchart showing the editing, processing and outputting of evaluation data in the terminal node.

FIG. 5 shows the flow of the processing of editing, processing and outputting evaluation data in the terminal node 11a serving as a processing node. In the example of FIG. 5, the terminal node 11a inquires through its input unit 10 a transaction of editing, processing and outputting from the distributed host node 21a and host node 31a and outputs the evaluation data for itself at its output unit 13. When the editing/processing/outputting for the evaluation data for the host node 31a, distributed host node 21a and terminal node 11a are to be performed, an editing/processing/outputting request 105 is manually input through the terminal node input unit 10. Then, in evaluation data input processing 118, as described above, these evaluation data 124, 125 and 126 are extracted successively from the terminal node storage unit 12. The evaluation data 124, 125 and 126 used in the processing 118 have the same storage area, and the response information 121, resource load information 122 and batch processing state information 123 of each of the evaluation data 124, 125 and 126 have the same storing time. In editing/processing/outputting processing 119, the evaluation data 124, 125 and 126 are edited in their output format to be output as a sheet from the terminal node output unit 13.

Figure 6:
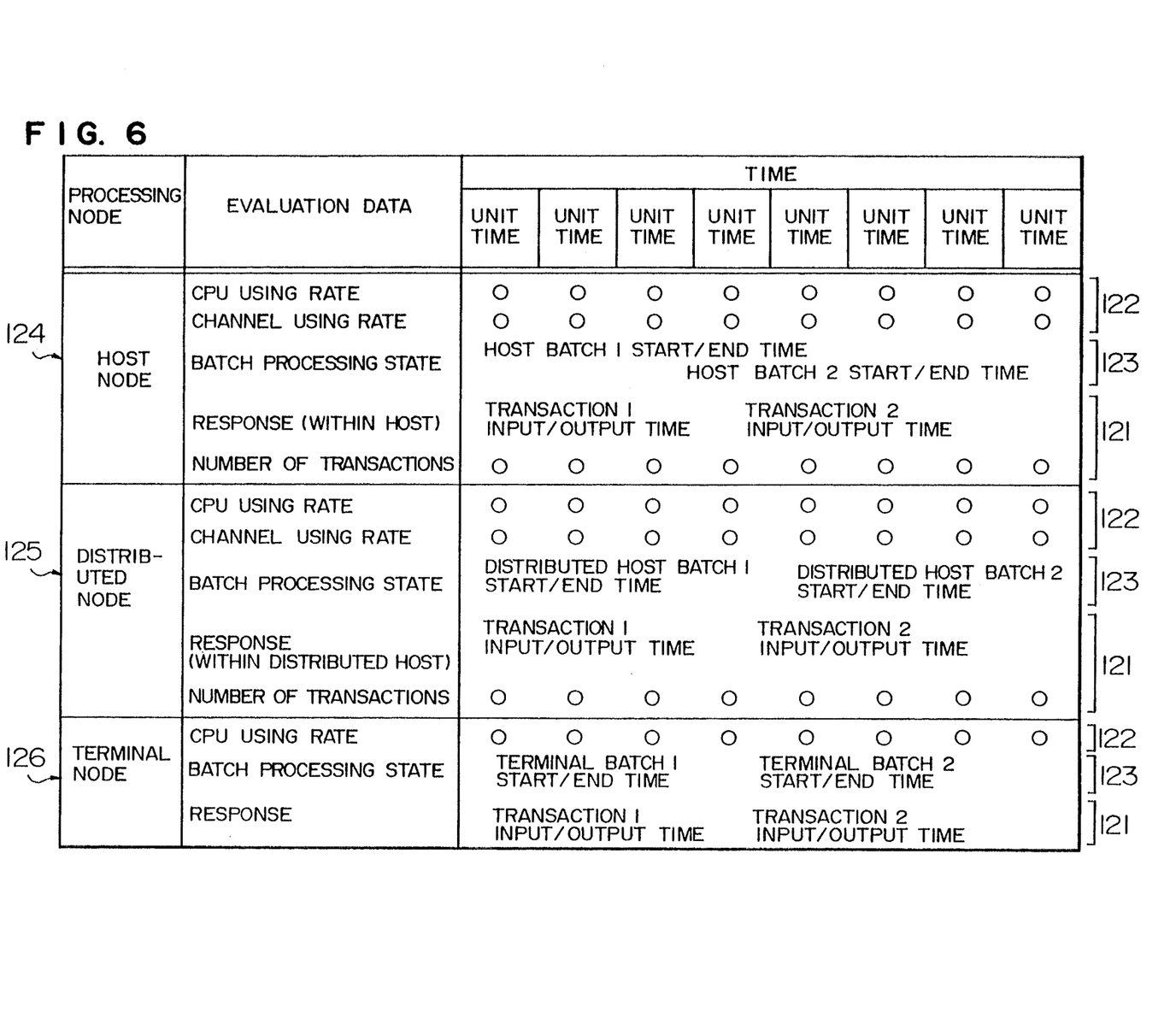
FIG. 6 is a view for explaining a typical example of the evaluation data collected in the terminal node.

FIG. 6 shows the sheet on which the output evaluation data has been written. Referring to FIG. 6, the output result will be explained. As described above, the processing nodes, the evaluation data for which is to be collected, include the host node 31a, distributed host node 21a and terminal node 11a. With respect to the evaluation data 124 for the host node 31a, a CPU using rate and a channel using rate correspond to the resource load information 122, a batch processing state corresponds to the batch processing state information 123, and a response (in the host node) and the number of transactions correspond to the response information 121. With respect to the evaluation data 125 for the distributed host node 21a, the CPU using rate and the channel using rate correspond to the resource load information 122, the batch processing state corresponds to the batch processing state information 123, and the response (in the distributed host node) and the number of transactions correspond to the response information 121. With respect to the evaluation data 126 for the terminal node 11a, the CPU using rate corresponds to the resource load information 122, the batch processing state corresponds to the batch processing state information 123, and the response (in the terminal node) corresponds to the response information 121. The times will be explained below. They represent the storing times for the response information 121, resource load information 122 and batch processing information 123. Concerning the resource load information 122 generally designated by ○ marks, the CPU using rate and channel using rate are represented in term of % for each unit time. Concerning the batch processing state information 123, the batch processing state is represented by the starting and ending times of the batch processing. Concerning the response information 121, the response is represented by the input and output times of a transaction in both transmission directions, and the number of transactions is generally represented by ○ marks which indicate the number of transactions for each unit time. It should be noted that the response information 121 for the terminal node 11a does not include the number of transactions.

As described above, the host node 31a, distributed host node 21a and terminal node 11a are provided with the evaluation data in the same format and correlated with one another in the information discrimination codes and storage areas, and the evaluation data are caused to include the storing times representing when they have been created. For this reason, at any time, the respective evaluation data 124, 125 and 126 for the host node 31a, distributed host node 21a and terminal node 11a can be collected, edited and output in any of the host node 31a, distributed host node 21a and terminal node 11a. Therefore, the performance between the processing nodes in a hierarchical form can be efficiently evaluated without using manual operation and that of the specific processing node can also be easily evaluated.

In the above embodiment, an explanation has been mainly given of the case where collection of the evaluation data for the processing nodes, i.e., the host node 31a and distributed host node 21a is requested by the terminal node 11a. But, it is needless to say that the evaluation data 124, 125 and 126 can be collected by the host node 31a or distributed host node 21a like the terminal node 11a. Further, in the above embodiment, the evaluation data has been collected in a dedicated transaction, but can be also collected in the format in which it is supplied in a usual data transfer.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

I claim:

1. An evaluation data collecting system for an information processing system connecting plural processing nodes with one another by communication paths and collecting evaluation data representative of the operation state of each of the processing nodes, comprising:

a terminal node, a distributed host node and a host node, wherein said distributed host node is connected to said terminal node through a local area network (LAN) and said host node is connected to said distributed host node through a wide area network (WAN);

wherein each of said terminal node, said distributed host node and said host node includes:

an I/O unit for inputting a collection request for evaluation data of one of said nodes at issue and of other nodes and outputting the evaluation data from the other nodes via either of said LAN or said WAN;

a processing unit for processing an input of the collection request for the evaluation data and an output of the evaluation data at said I/O unit via either of said LAN or said WAN; and a storage unit for providing the evaluation data for each node at issue and for the other nodes with a time element synchronized with data transfer between said nodes and storing the evaluation data for each node at issue and for the other nodes in substantially the same data format, wherein said evaluation data includes response information, resource load information and batch processing state information; said response information includes records of an input time when a request of transaction for collecting evaluation data for the other nodes is input for either one of said terminal node, distributed host node and host node and an output time when the transaction is output from said one node to the other nodes, and said resource load information includes records of the using rate of a CPU (Central Processing Unit) in said processing unit and the channel using rate for data input-/output for a data storage device in said storage unit, and said batch processing state information includes records of starting and ending times of batch processing when the CPU in said processing unit is used for the batch processing.

2. An evaluation data collecting system for an information processing system according to claim 1, wherein each of said terminal node, distributed host node and host node includes said I/O unit, said processing unit and said storage unit.

3. An evaluation data collecting system for an information processing system according to claim 1, wherein each of said response information, resource load information and batch processing information includes an information discrimination code, for discriminating each item of information from others, and a storing time; and the storing time of the response information is data indicating when the transaction has been stored in said storage unit, that of the resource information is data representing when said CPU using rate and channel using rate have been stored in said storage unit, and that of said batch processing state information is data indicating when a batch processing program has been stored in said storage unit.

4. An evaluation data collecting system for an information processing system according to claim 3, wherein each data format of said response information, resource load information and batch processing state information includes an information discrimination code, a storing time and storage area as time elements in succession from its start.

5. An evaluation data collecting system for an information processing system according to claim 4, wherein the same information discrimination code and storage area among said response information, resource load information and batch processing state information give correlation at least among these items of information so that evaluation data are specified for any one of said terminal node, distributed host node and host node.

6. An evaluation data collecting system for an information processing system according to claim 5, wherein each item of information of said response information, resource load information and batch processing state information with their information discrimination codes and storage areas correspond with one another and their storage times correspond with one another, and are supplied to each of said host node, distributed host node and terminal node.

* * * * *